UNITED STATES PATENT OFFICE.

JOHAN HJALMAR LIDHOLM, OF LONDON, ENGLAND.

PROCESS OF PRODUCING CALCIUM CYANAMID.

1,125,350. Specification of Letters Patent. Patented Jan. 19, 1915.

No Drawing. Application filed February 14, 1914. Serial No. 818,787.

*To all whom it may concern:*

Be it known that I, JOHAN HJALMAR LIDHOLM, a citizen of the Kingdom of Sweden, residing at London, Great Britain, have invented new and useful Improvements in Processes of Producing Calcium Cyanamid, of which the following is a specification.

As is well known, calcium cyanamid is produced by heating calcium carbid or a mixture of burnt lime and coal in suitable proportions to a suitable temperature while nitrogen is supplied. The formation of calcium cyanamid from calcium carbid and nitrogen may be expressed by the following formula:

$$CaC_2 + N_2 = CaN_2C + C.$$

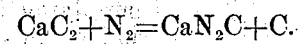

It is well known that this process has not yet reached its technical perfection, but is still suffering from certain inconveniences which have hitherto not been overcome. Thus for instance the above mentioned reaction does not take place so completely that a quantitative output is obtained. From theoretical point of view, the carbid of the market containing 70 per cent. of pure carbid should give calcium-cyanamid containing 23.4 per cent. of nitrogen. In reality, such an output has, however, never been obtained in the industrial application; at the most a percentage of nitrogen of 20 per cent. has been attained. Moreover, such a high percentage has been attainable only by such an abundant supply of nitrogen that the process becomes uneconomical.

When the above named reaction takes place, considerable quantities of hydrogen and other gases are formed which dilute the nitrogen and have to be removed from the furnace of reaction, in order that the reaction shall proceed advantageously. The said removal of the gases in question can, obviously, not be effected without wasting, at the same time, considerable quantities of nitrogen. In reality, such losses of nitrogen amount to 40 per cent. at the least and in many cases increase to 60 per cent. of the total consumption of nitrogen.

In order to increase the output and at the same time to accelerate the reaction, proposals have been made to use additions acting catalytically, preferably calcium chlorid and calcium fluorid, by means of which the absorption of nitrogen is facilitated, and the reaction under such circumstances is caused to take place at lower temperatures than otherwise.

Proposals have also been made to supply for the same purpose the nitrogen at a high overpressure by means of which the reaction may be accelerated essentially, and it has even been proposed to use high pressure on the nitrogen and at the same time to add to the carbid substances acting catalytically, in order to still more accelerate the reaction. In applying the said methods industrially it has, however, been found that the output of cyanamid is far from quantitative. This probably depends on the fact that if the reaction which proceeds exothermically be accelerated too much, such an increase of the temperature will occur at certain points that the calcium cyanamid formed will melt or sinter and on account thereof the nitrogen will be prevented from penetrating completely into the carbid. It has also been found, when breaking the blocks of cyanamid into pieces, that they contain larger or smaller balls of untransformed calcium carbid embedded in the mass of cyanamid.

The present invention relates to a process of producing calcium cyanamid by means of which all the inconveniences mentioned above will be obviated or at least be considerably reduced. The invention is based on the observation that the reaction between the nitrogen and the calcium carbid may be caused to proceed with a great output, if the nitrogen be supplied at an overpressure, and the carbid at the same time diluted by inactive substances added in such a quantity, that the temperature of the mass of carbid is prevented, during the proceeding of the reaction, from reaching the temperature of sintering of the calcium cyanamid.

The degree of dilution of the carbid by inactive substances depends upon the magnitude of the overpressure used. It may by way of example be mentioned that the inventor, in using a carbid containing 60 per cent. $CaC_2$ only and an overpressure of 1 atmosphere, has obtained calcium cyanamid containing 20 per cent. nitrogen, the loss of nitrogen, when ventilating the furnace of reaction, amounting to 20 per cent. only of the total consumption of nitrogen. By using a higher overpressure the percentage of $CaC_2$ of the carbid used may be reduced successively, so that, in using an overpressure of 5 to 10 atmospheres, a percentage of 55 to 50 per cent. of $CaC_2$ will give the best results. The dilution of the carbid may be effected either by producing initially a carbid of low percentage or by diluting a carbid of high percentage by inactive substances, as for instance sand, or the like.

The improved effect attained by the present invention may be explained by this that the supply of nitrogen at an overpressure exerts an accelerating influence upon the reaction, said influence being the stronger, the higher is the pressure used, whereas the inactive additions absorb heat and thus prevent the temperature, in spite of the speedier proceeding of reaction, from reaching at any point of the mass the temperature of sintering of the calcium cyanamid. Therefore, the percentage of inactive additions is to be taken in a certain proportion to the overpressure used and the speed of reaction caused thereby, which proportion may be easily found by experiments for each separate type of furnace and each separate kind of carbid used.

The fact that the consumption of nitrogen for ventilating of the furnace may be reduced as considerably as is evident from the example stated above, may be explained, on the one side, by this that the controlling of the temperature of the furnace effected by means of the present invention reduces the formation of noxious gases in the furnace, and, on the other side, by this that the overpressure exerted upon the nitrogen reduces the noxious influence of the gases formed upon the proceeding of the reaction.

The results obtained by means of the invention prove that the general opinion that, in producing calcium cyanamid, a carbid of a percentage as high as possible is to be used, is not correct, in as much as the comparatively low outputs hitherto attained are caused even by the too strong increase of temperature due to an accelerated reaction in a mass of carbid of high percentage. Further, the present invention has proved that a suitable adjusting of the pressure of the nitrogen renders all additions of catalytic substances dispensable and will even increase considerably the output, if, at the same time, by diluting correspondingly the carbid, the temperature is prevented from rising at certain points or in larger portions of the mass on account of the heat developed during the reaction.

Having now described my invention, what I claim as new and desire to secure by Letters Patent is:

The process of producing calcium cyanamid from calcium carbid and nitrogen, which consists in heating calcium carbid containing a percentage of heat absorbing, but otherwise inactive substances to a suitable temperature, and supplying the nitrogen to the calcium carbid at an over-pressure suited to the percentage of heat absorbing substances, substantially as and for the purpose set forth.

In testimony that I claim the foregoing as my invention, I have signed my name in presence of two subscribing witnesses.

JOHAN HJALMAR LIDHOLM.

Witnesses:
J. COLLISON HAILEY,
MURRAY A. CANN.